United States Patent [19]

Sekimoto et al.

[11] Patent Number: 4,786,981
[45] Date of Patent: Nov. 22, 1988

[54] EDIT MODE CONTROLLER

[75] Inventors: Satoshi Sekimoto, Kanagawa; Seiji Saitou, Saitama, both of Japan

[73] Assignee: Sony Corporation, Tokyo, Japan

[21] Appl. No.: 941,046

[22] Filed: Dec. 12, 1986

[30] Foreign Application Priority Data

Dec. 18, 1985 [JP] Japan ................................ 60-284559

[51] Int. Cl.[4] .......................... H04N 5/78; G11B 27/02
[52] U.S. Cl. ..................................... 360/10.3; 360/13; 360/14.3; 360/71; 360/69
[58] Field of Search ............... 360/10.3, 13, 14.1–14.3, 360/69, 70, 71, 73, 60, 75

[56] References Cited

U.S. PATENT DOCUMENTS

| | | | |
|---|---|---|---|
| 4,358,797 | 11/1982 | Nishijima et al. | 360/14.2 |
| 4,488,185 | 12/1984 | Toba | 360/14.1 |
| 4,673,991 | 6/1987 | Namiki et al. | 360/14.2 X |
| 4,691,251 | 9/1987 | Ookawa et al. | 360/14.1 |
| 4,701,813 | 10/1987 | Miyake et al. | 360/71 |

Primary Examiner—Aristotelis M. Psitos
Attorney, Agent, or Firm—Lewis H. Eslinger; Jay H. Maioli

[57] ABSTRACT

An edit mode controller for use in editing magnetic tapes using multiple video tape recorders, in which when one of the recorders is placed in a still or pause mode while waiting for the dubbing location on the other tape to be found, prevents damage to the tape by the repeated scanning of the head in the pause mode by detecting the elapse of a predetermined time period and incrementally advacing the tape by a few number of tracks, then placing the recorder back into the pause mode. The control pulses normally found on video tapes are used to both advance the tape the desired increment and also to rewind the tape back to the desired starting point, once the dubbing point on the other tape has been found.

8 Claims, 5 Drawing Sheets

EDIT MODE CONTROLLER

BACKGROUND OF THE INVENTION

1. Field of the Invention

This invention relates generally to a method and apparatus for editing magnetic recording media and, more particularly, to an editing method and edit-mode controller intended for use with at least two video tape recorders.

2. Description of the Background

During an editing operation on a long-playing video tape using conventional video tape recorders (VTRs), it is frequently necessary to place one or both of the VTRs into a so-called still mode, wherein the rotary head repeatedly scans the same location on the tape. For example, when dubbing is performed using two VTRs, in which one reproduces the video signal of a desired program recorded on a respective tape while the other VTR records that reproduced video signal at a designated portion on another video tape, it is necessary to search for a reproducing start point and a recording start point on the respective video tapes. Such searching cannot typically be performed simultaneously so that if the recording start point is being searched for in the recording VTR after the reproducing start point has already been determined in the playback VTR, the latter VTR must be placed in the still mode until the recording start point is determined. One video tape editor known heretofore is described in U.S. Pat. No. 4,463,391 and operates to place the video tape recorder in a pause mode, corresponding to the above-described still mode, and the tape is returned mechanically for a short distance in order to place it in a proper position so that when the video tape recorder commences recording, the track pitch of the previously recorded portion and the newly recorded portion will be substantially identical.

Video tape recorders are typically constructed so that the heads are mounted on a rotary drum to be in contact with the magnetic tape and scan at a relatively high rotational rate. Therefore, if the video tape recorder remains for a relatively long period of time in the still or pause mode, in which the magnetic tape is stopped yet the rotary heads continue to rotate, a portion of magnetic tape at that location is subject to repeated contact by the heads, and the tape is likely to have its magnetic layer damaged. Not only does such tape damage occur but frequently a transfer of the magnetic particles from the tape to the head will also take place. In any event, both of these possible conditions will result in a signal dropout upon reproduction in the normal mode of signals recorded at that location on the tape.

One approach that has been proposed to overcome this problem when the still mode continues for a lengthy period of time is to automatically release the VTR from the still mode after a predetermined period of time has elapsed. This, of course, will protect the tape from degradation caused by the repeated scanning of the VTR heads at the same location. For example, after six minutes have elapsed in the still mode, the VTR used for recording is released from the still mode during the time that the desired portion on the tape to be reproduced is being searched for by the playback VTR. The problem then is once the desired portion to be reproduced is found by the reproducing VTR, the recording VTR has already run its tape at a normal speed so that it is necessary to once again search for the recording starting point on the tape by the recording VTR. It has been found that if a VTR is released from the still mode during such editing procedures described above, it takes a relatively long period of time to complete the overall editing operation.

OBJECTS AND SUMMARY OF THE INVENTION

Accordingly, it is an object of the present invention to provide a method and apparatus for editing a magnetic recording tape utilizing at least two video tape recorders that can eliminate the above-noted defects inherent in the prior art.

Another object of the present invention is to provide an edit-mode controller capable of protecting a magnetic tape from being abraded and damaged by the rotary heads of the video tape recorder caused by a long term scanning and in which the video tape may be easily returned to its initial position in a still mode or pause scanning position at which the editing was desired to have been commenced.

In accordance with an aspect of the present invention, an edit mode controller is provided that is intended for use with a recording and reproducing apparatus that records or reproduces a video signal from respective magnetic tapes by use of rotary magnetic heads that scan the tape, in which the tape includes pulses or control signals recorded thereon, by providing a system to detect the position of the tape relative to the magnetic head using those control signals and then using a timing mechanism to determine the length of time during which the heads repeatedly scan a specific location on the tape. A command signal generator is provided to produce a command signal that causes a step-by-step movement relative to the heads and the tape so that the heads scan different tracks on the magnetic tape, when it has been determined that the predetermined length of time has been exceeded at that specific location on the tape.

Another aspect of the present invention involves a method for editing video signals using an edit mode controller that is adapted to operate with first and second recording and reproducing systems, whereby the video signals are recorded or reproduced on first and second magnetic tapes by respective magnetic heads that scan the tapes. This method also involves determining the elapsed time during which the head repeatedly scans the same position on the magnetic tape and provides relative tape/head movement to tracks on the magnetic head other than those being repeatedly scanned. This method is adaptable for either or both of the two video tape recorders making up the editing system.

The above and other objects, features, and advantages of the present invention will become apparent from the following detailed description of illustrative embodiments thereof, to be read in conjunction with the accompanying drawings, in which like references numeral represent the same or similar elements and parts.

DESCRIPTION OF PREFERRED EMBODIMENT

Figure 1:
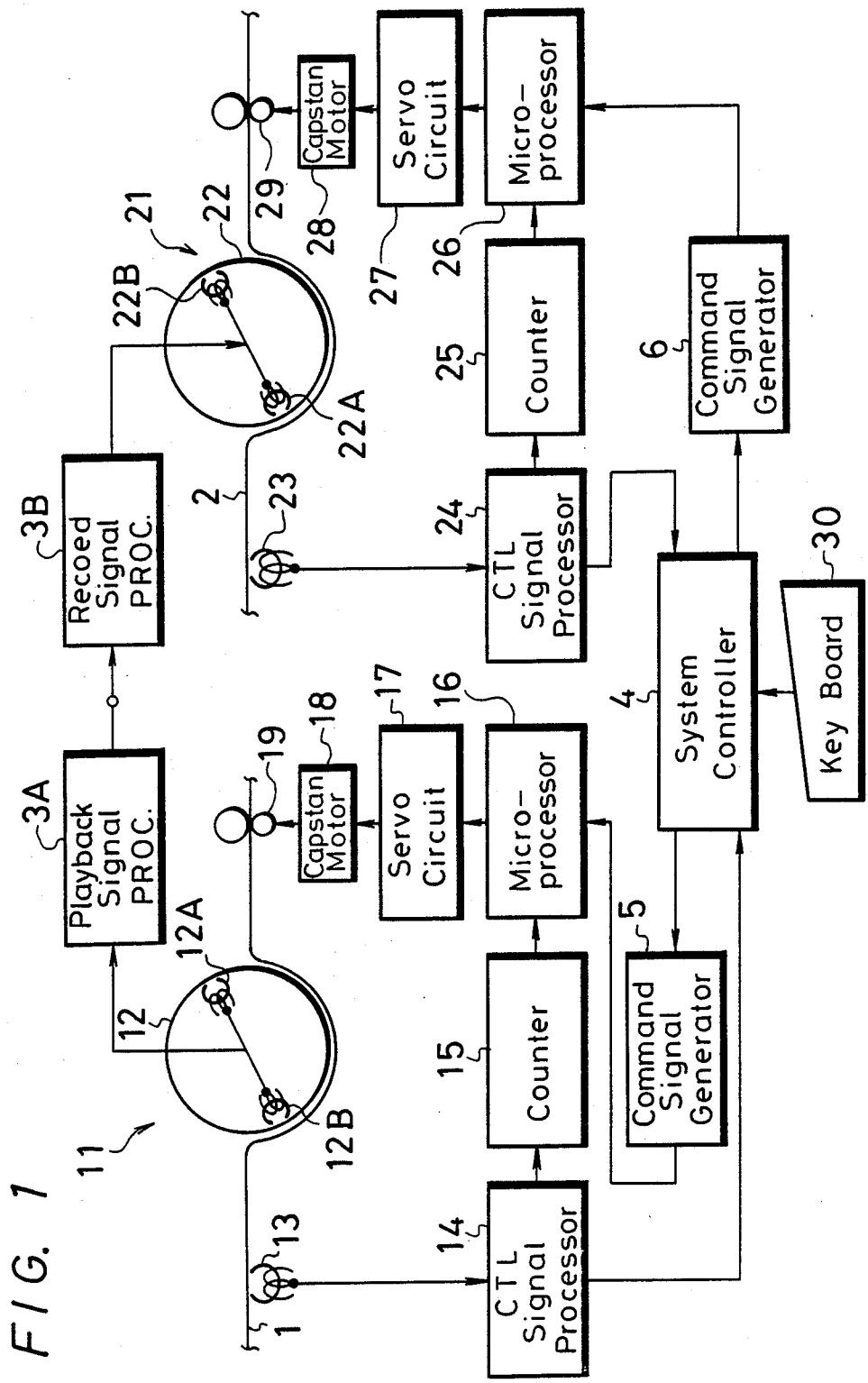
FIG. 1 is a schematic in block diagram form of an embodiment of an edit mode controller according to the present invention.

Referring now to FIG. 1, the edit mode controller taught by the present invention is provided to perform a tape editing operation wherein a video signal reproduced from a first magnetic tape 1 by means of a first video tape recorder (VTR) 11 will be recorded on a second magnetic tape 2 by a second video tape recorder (VTR) 21. More particularly, video signals previously recorded are reproduced from magnetic tape 1 by two rotary magnetic heads 12A and 12B mounted on a rotary head drum 12 in first VTR 11. The signals from heads 12A and 12B are converted into a video signal in playback signal processor 3A that is part of VTR 11.

Once the reproduced signals have been processed into video signals in the conventional fashion in playback processor 3A, they are fed to the second video tape recorder 21, where they are first converted into signals suitable for recording in signal processor 3B and are then recorded on the second magnetic tape 2 by rotary magnetic heads 22A and 22B mounted on rotary head drum 22. Although not shown in FIG. 1, both rotary drums 12 and 22 of the first and second VTRs 11 and 21, respectively, each typically include an erasing head.

Figure 5:
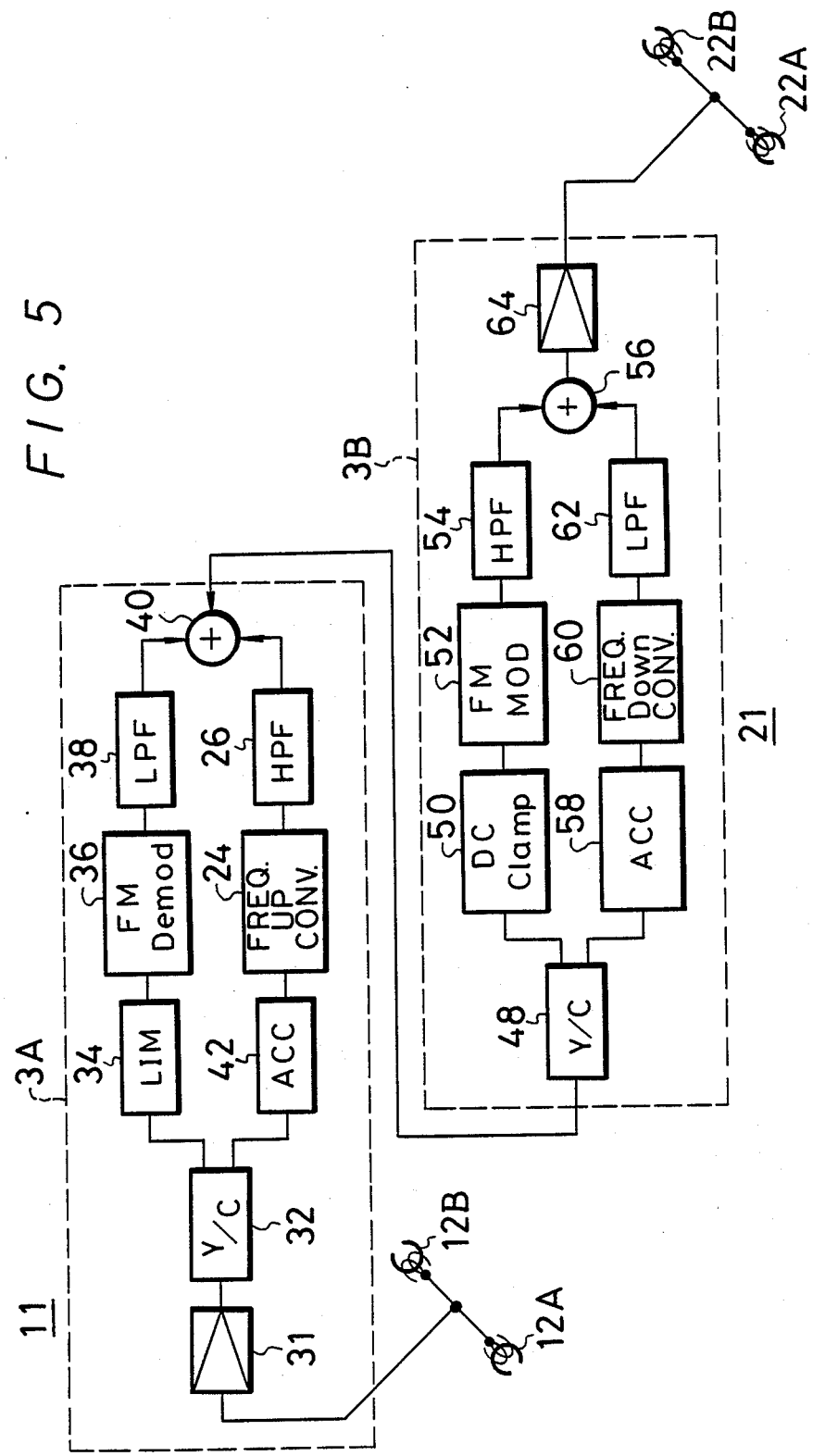
FIG. 5 is a schematic in block diagram form of video signal processors suitable for use in the edit mode controller of FIG. 1.

The video signal processing that takes place in playback signal processor 3A and in record signal processor 3B is, of course, well known and typical circuit arrangements useful in performing such video signal processing are shown in FIG. 5. Because video signal processing is part of conventional VTRs it forms no part of the present invention and need not be explained at this point, however, an example will be discussed hereinbelow.

Respective servo systems provided in VTRs 11 and 21 provide control signal (CTL) reproducing circuits 14 and 24 with the appropriate control signals that have been already recorded on a control track of the respective magnetic tapes 1 and 2 and which are reproduced by fixed magnetic heads 13 and 23 mounted in respective VTRs 11 and 21. The reproduced CTL signals are then waveform shaped by respective CTL signal processing circuits 14 and 24 and then fed to respective counters 15 and 25. The signal processing of the control signals simply represents a squaring of the reproduced control signal waveforms. The outputs of CTL signal processors 14 and 24 are also fed to the system controller 4.

The system controller 4 provides information or commands to microprocessors 16 and 26 through command signal generator circuits 5 and 6, respectively, in order to advance each of the two magnetic tapes 1 and 2 in synchronism with the generation of the CTL signals in one of the various playback modes, such as the still mode, slow motion playback, and cue-review playback. Such command signals are typically provided in the conventional video tape recorder and are initiated in response to the operation of a keyboard 30 by the operator of the editing control system. In addition, in accordance with a feature of the present invention, after a command signal from the system controller had been fed to one or another of the video tape recorders to place it in the still mode, after a period of six minutes has elapsed in that still mode, another command signal is delivered to that VTR to advance the video tape, either 1 or 2, by a four track increment. For example, if the CTL signal consists of a pulse for each video in the tracks, then counter 25, for example, counts 2 CTL signal pulses and then stops the advancement of the tape. Therefore, the particular VTR seemingly remains in the still mode condition, however, the tape has been advanced by four tracks, which is this example corresponds to four fields. Upon receiving such count signal from the counters 15 or 25 microprocessors 16 and 26 then provide the respectiee capstan servo circuits 17 and 27 with a servo control signal, whereby the capstan servo circuits control the capstan motors 18 and 28, respectively. The capstan motors 18 and 28 respective tape drive capstans 19 and 29 control the advancement of the respective video tapes 1 and 2 based on respective servo control signals.

Summarizing then, it is seen that based upon the embodiment of FIG. 1, the system controller 4 receives the CTL signals from the respective VTRs 11 and 21 and supplies microprocessors 16 and 26 with command signals, which are based on the control signals of the two tapes, thereby synchronizing the VTRs 11 and 21 with each other. By this synchronizing the VTRs with each other, the first VTR 11 reproduces the video signal recorded on video tape 1 while VTR 21 records on video tape 2 the reproduced signal recorded on video tape 1, and the tape editing process is performed.

Figure 2A:
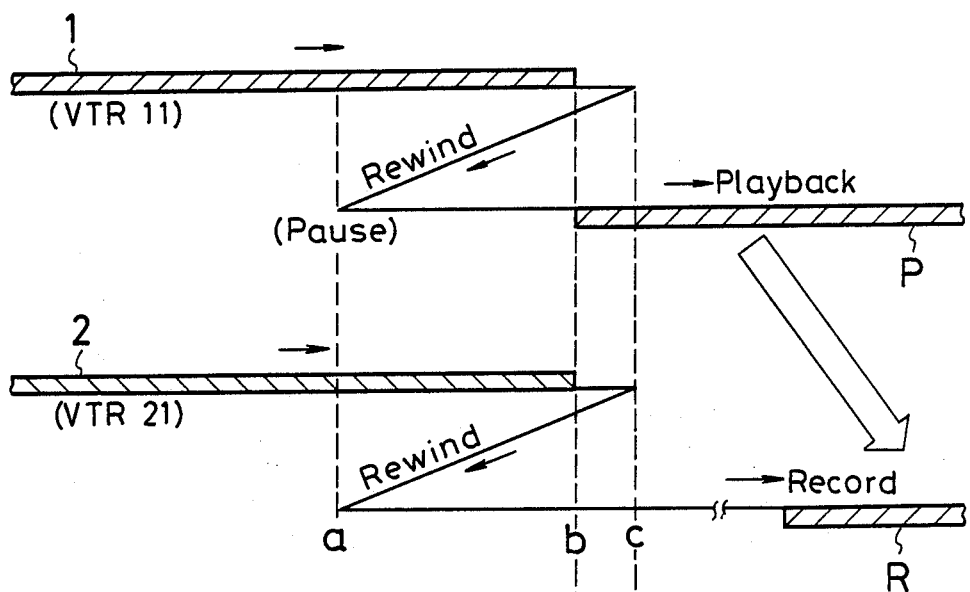
FIGS. 2A and 2B are diagrammatic representations useful in explaining the operation of the edit mode controller of FIG. 1.
Figure 2B:
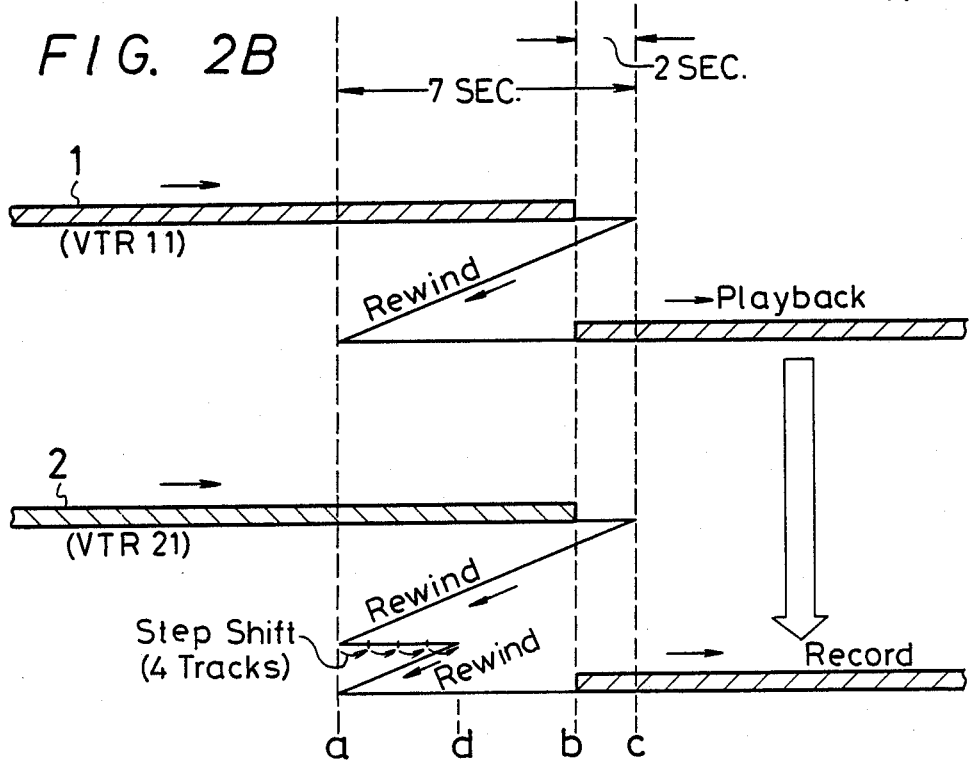
Figure 3:
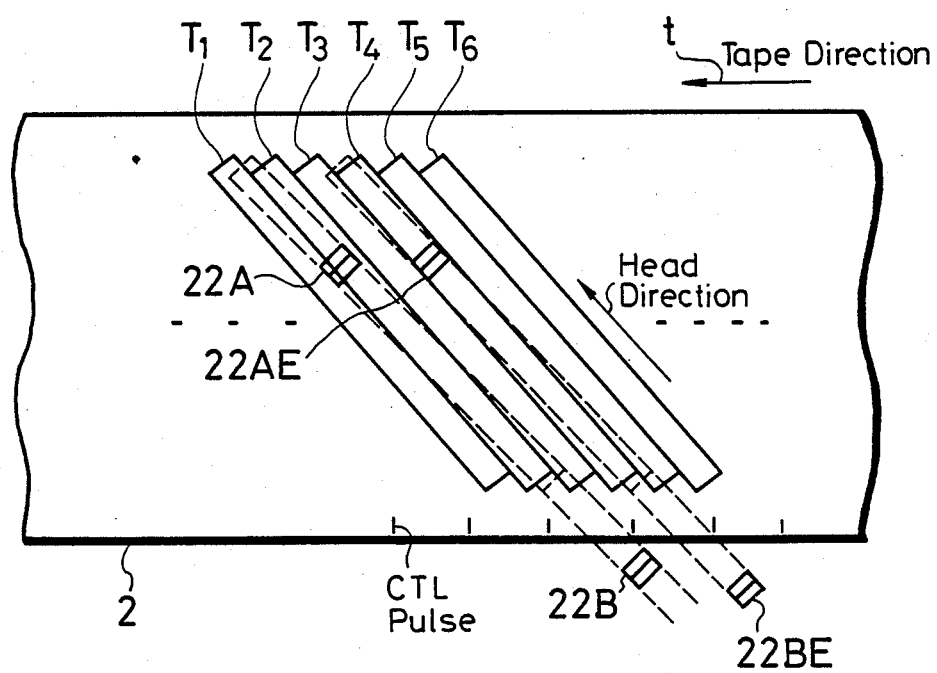
FIG. 3 is a diagrammatic representation of tracks formed by heads scanning a magnetic tape.
Figure 4:
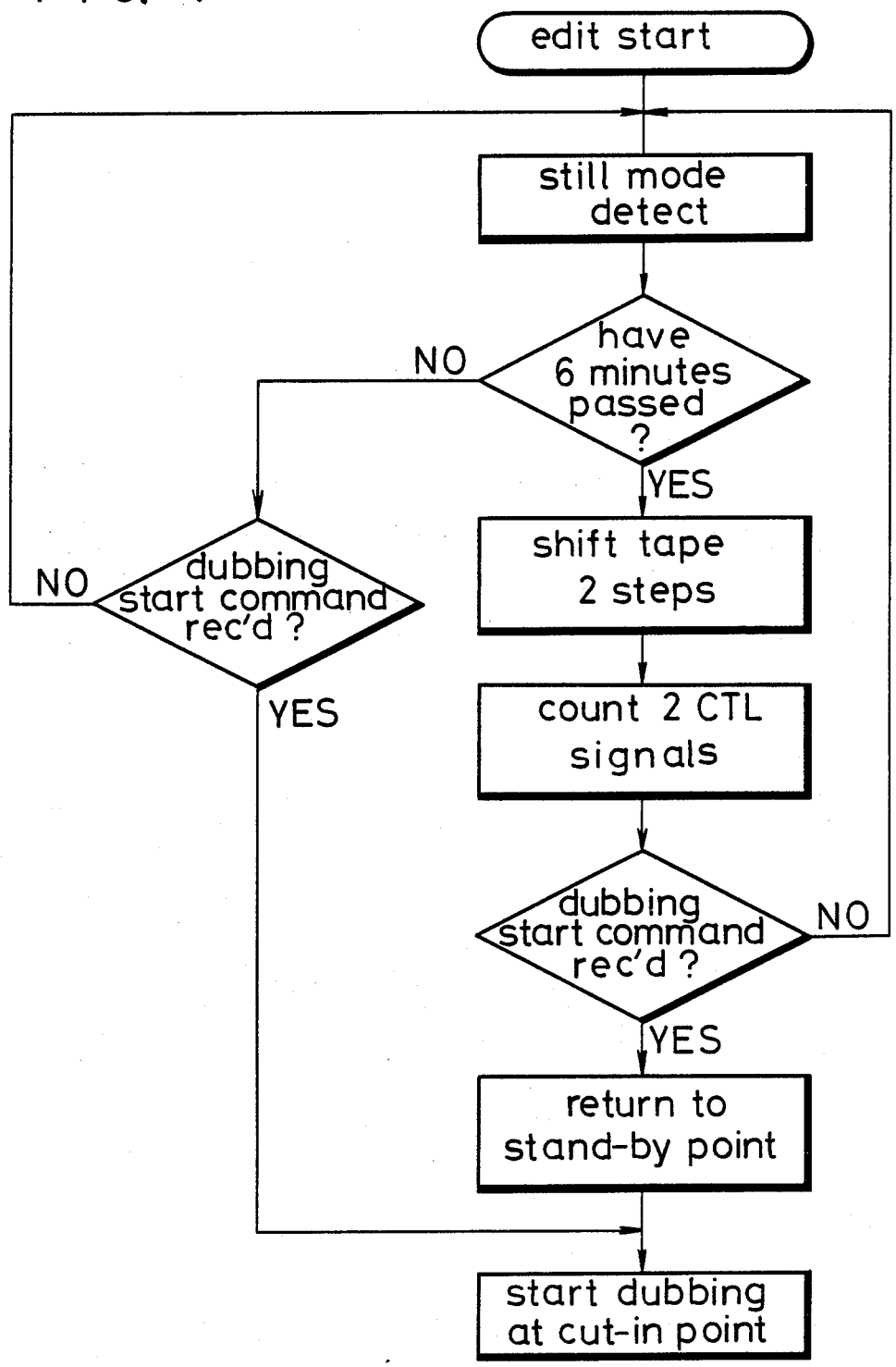
FIG. 4 is a flow chart showing the operation of the edit mode controller according to the present invention for use with a video tape recorder in a still mode.

As a further example of the editing procedure based upon the above-described apparatus, a method of calling up an edit point or start point on a tape at the commencement of the editing operation is described in relationship to FIGS. 2 through 4.

FIG. 2A shows the manner in which the two video tapes are controlled following an editing procedure known heretofore. Initially, a recording start point on video tape 2 is determined by use of the second VTR 21 and, as shown in FIG. 2A, assuming that a portion of the program of video tape 1 is to be reproduced and then recorded on video tape 2 behind a cut-in point b on video tape 2, then system controller 4 provides microprocessor 26 with a command signal to return video tape 2 from a point c that is immediately after point b, when point b is detected by counter 25 that is counting a predetermined number of CTL signals. In this example, the distance between points b and c corresponds to approximately two seconds. More particularly, microprocessor 26 commands tape 2 to be moved to a point several seconds before point c, for example, seven seconds, which corresponds to five seconds before the recording or dubbing start point. Now, at this time, VTR 21 is standing by in a still mode, or pause condition, at stand-by point a, to which tape 2 has been rewound. Point a is the so-called preroll point. Next, a playback start point of video tape 1 is determined by VTR 11, while VTR 21 remains on standby in the still mode. Assuming that the portion of the program behind point b of video tape 1 is to be recorded on video tape 2, then system controller 4 provides microprocessor unit 16 with a command signal to rewind video tape 1 from a point c immediately after the time when point b has been detected by using counter 25 to count a predetermined number of CTL signals so as to place tape 1 at a point several seconds before point c. In this example, the distance between points b and c can correspond to two seconds and, thus, the point a is five seconds before the recording start point b or seven seconds before the detection point c. Then, VTR 11 is once again placed into the still mode at standby point a to which tape 1 has been rewound. Thus, when VTRs 11 and 21 are both in the still mode with tapes 1 and 2 stopped at respective points a, system controller 4 sends command signals to both microprocessors 16 and 26 to commence the advancement of the respective video tapes 1 and 2 in synchronism with each other. In this fashion, the dubbing is effected from video tape 1 to video tape 2 from edit start point b, which is for example five seconds after the preroll point a to the desired point, not shown in FIG. 2A. The dubbing is started from point b after the tape has been advanced, for example, five seconds from the preroll point a, because phase synchronization is required in the servo systems, namely, the capstan motors, drum motors and the like, of the two VTRs 11 and 21. This phase synchronization between the two VTRs is achieved by using the CTL pulses recorded on both tapes 1 and 2. Further, the time period of two seconds that exists between points b and c is provided in order to accommodate any tape overrun due to the inertia of the tape advance system.

During the editing process described hereinabove, in the event that six minutes have elapsed with VTR 21 being left in the still mode, or pause state, during the time that a desired edit point or reproducing start point on tape one is being searched for, VTR 21 can be released from the still mode to run tape 2 at a normal slow speed, in order to protect tape 2 from damage. Therefore, when the cut-in point b on tape 1 has finally been determined, tape 2 will already have been advanced, and the recording area R on tape 2 that is to receive the playback signal indicated at P in tape 1 has already been shifted from the cut-in point b. It is this situation that is avoided by the present invention.

The method for calling up the edit point according to the present invention is described with reference to FIG. 2B, in which even if it does take a long time to determine cut-in point b on the playback tape 1, tape 2 is advanced only a short predetermined distance and then stopped each time of the predetermined time elapses. Accordingly, in the example discussed above tape 2 is advanced in step-by-step fashion every six minutes. FIG. 2B represents a situation where the tape was advanced and stopped four different times, that is, it took 24 minutes (6 mins. ×4) to determine the cut-in point b of playback tape 1, and this step advancement of tape 2 is clearly shown in FIG. 2B. More particularly, by means of a command signal supplied by system controller 4, VTR 21 causes tape 2 to advance in four-track increments, each time that control signal is received.

In order to more clearly see this step-by-step tape shift, attention is directed to FIG. 3, which shows the tracks typically formed on video tapes 1 and 2 as comprising a plurality of oblique tracks $T_1$, $T_2$, $T_3$, $T_4$, $T_5$, and so on, in which the video signals are recorded. Assumed that VTR 21 remains in the still mode wherein track $T_1$ is being repeatedly scanned by two rotary magnetic heads 22A and 22B and, simultaneously, track $T_3$ which is two tracks behind track $T_1$ is scanned by rotary erasing heads 22AE and 22BE, so that the video signals recorded at that location can be erased by such erasing heads. After six minutes have elapsed in this described condition, the tape is advanced by four tracks in the tape drive direction, shown by arrow t, and is then stopped again. VTR 21 remains in the still mode and now track $T_5$ is being repeatedly scanned by rotary heads 22A and 22B and track $T_7$ is being repeatedly scanned by the rotary erasing heads 22AE and 22BE.

In keeping with the above description, each time a period of six minutes elapses while VTR 21 remains in the still mode, VTR 21 is released from the still mode to advance tape 2 by four tracks and is then placed back again into the still mode. This operation is repeated every six minutes.

Referring back to FIG. 2B, when the edit point on tape 1 is determined finally after tape 2 has been advanced from the standby point a to some point d by the step advancement operation described above, tape 2 must be then be returned from the advance point d to the standby point a. By returning tape 2 to standby point a, it is therefore possible to run video tapes 1 and 2 from the standby point a at the same time to thereby commence the dubbing procedure from point b, so that by such time VTRs 11 and 21 should be in synchronization one with another.

The decisional steps effected by the system controller 4 during the time VTR 21 remains in the still mode are represented in the flow chart of FIG. 4. When VTR 21 is set into the still mode, it is checked whether or not a predetermined period of time has elapsed, for example, whether six minutes have passed. If it is found that six minutes have not passed and the dubbing start command has not been actuated, then the system controller maintains the video tape recorder 21 in the still mode until either six minutes have elapsed or the dubbing start command has been issued, which ever comes first. In the event that six minutes elapses before the dubbing start command is issued, then system controller 4 provides microprocessor 26 with a command signal sufficient to run tape 2 until counter 25 counts two CTL signals, that is, in this example, until the tape 2 has been advanced by four tracks relative to each head 22A and 22B, and the tape 2 is stopped again. Note that each step or shift of the tape relative to a head involves two tracks, because adjacent tracks relate to signals recorded with head having different azimuth angles. Therefore each shift really involves a two track shift. If the dubbing start command has still not been actuated, the six minute time period is counted and the tape shifted by two steps, which corresponds to four tracks, and the two CTL signals are counted. This loop is repeated until such time as the dubbing start command signal is finally received. When the dubbing start command is actuated after having advanced tape 2 by at least four tracks, system controller 4 commands VTR 21 to first rewind tape 2 to the standby point a and then to run tape 2 to start the dubbing procedure from the cut-in point b of both tapes 1 and 2. Of course, it is easily possible to rewind the tape 2 back to standby point a, because the system controller knows how many step advance operations have taken place and, thus, knows how many CTL signals have been counted and it ss then a simple matter to run the tape backward and count the same number of CTL signals before stopping the tape.

In all cases, it may not be necessary to rewind the tapes back to the standby point a, because if only four tracks have been shifted in certain situations the editing process may commence from point d.

FIG. 5 is a block diagram representing the signal processors 3A and 3B of FIG. 1, which are typically part of VTRs 11 and 21, respectively. The signal reproduced by heads 12A and 12B is fed through a playback amplifier 31 to a luminance/chrominance separator 32. The luminance signal is fed through a limiter 34, and FM demodulator 36, and a low pass filter 38 to one input of a signal adder 40. Similarly, the chrominance signal is fed through an automatic chrominance corrector circuit 42, a frequency up converter 24, and a high pass filter 26 before being fed to the second input of adder 40. This is all well known because all video tape recorders shift the chrominance signal down in frequency and FM modulate the luminance before recording.

The output of processor 3A is a composite color video signal, and this is fed to the processor of VTR 21, which is shown at 3B, in order to be processed for recording. Thus, luminance/chrominance separator 48 provides the luminance signal through DC clamp circuit 50, FM modulator 52, and high pass filter 54 to one input of a signal adder 56. The chrominance signal from separator 48 is fed through an automatic chrominance corrector circuit 58, frequency down converter 60, and low pass filter 62 to the other input of adder 56. The frequency shifted and modulated video signal is then fed through a record amplifier 64 to heads 22A and 22B for recording on tape 2.

As described hereinabove, according to the edit mode controller of the present invention, because the rotary heads do not scan the same tracks on a tape for more than a predetermined period of time, which in this example has been arbitrarily set at six minutes, the tape is prevented from being damaged. Furthermore, each time that such predetermined period of time elapses before an edit point on the original or playback tape has been found, the record tape is advanced in a step like fashion by only a predetermined number of tracks and is then stopped again. Accordingly, because the recording tape is not permitted to simply run free, the tape is not advanced far from the point at which the video tape recorder was set into the still mode. Accordingly, the determined cut-in point can be easily found once again, and it does not take much time to return to the cut-in point. Moreover, according to the present invention, the tape can be automatically rewound to the original standby point a once the dubbing procedure is started so that it is not necessary to search for the standby point a in the record tape.

Although in the above description, this embodiment has been in the context of the recording VTR being placed in the still mode or pause state, it is apparent that the same operation could be effected when the cut-in point of the tape to be recorded is determined while the playback VTR has been left in the still mode. Furthermore, the amount of tape to be advanced every time the predetermined period of time has elapsed can be arbitrarily determined.

In the instant embodiment described above, the step advancement function is applied to an edit mode controller, however, it will be appreciated that the same function could also be applied to ordinary VTRs and recording and reproducing apparatus using a magnetic sheet and the like with the same positive effects obtain in both cases. For example, when desired video signals to be recorded are received from a television tuner or a video camera and fed to a video tape recorder which is in the still state, the step advancement procedure described above is advantageous. Also, although in the above-described embodiment, the CTL signal is used to detect the tape position, the method of detecting the tape position need not be so limited and any other signal corresponding to a CTL signal could be used for such purpose.

The above description is given on a single preferred embodiment of the invention, but it will be apparent that many modifications and variations could be effected by one skilled in the art without departing from the spirit or scope of the novel concepts of the invention, which should be determined by the appended claims.

What is claimed is:

1. Apparatus for use in reproducing and recording video signals in tracks on a magnetic recording medium by a magnetic head that scans the magnetic recording medium, the apparatus comprising:
   means for transporting said magnetic recording medium;
   position detecting means for detecting a position of said magnetic recording medium relative to said magnetic head;
   mode selecting means for selecting a functional mode of said recording and reproducing apparatus from a plurality of modes including a still playback mode and a normal playback mode;
   detector means connected to said mode selecting means and to said position detecting means for determining whether said magnetic head scans one location on said magnetic recording medium for a predetermined period of time during a time that said recording and reproducing apparatus is in said still playback mode; and
   means connected to said means for transporting and said detector means for generating a command signal to move said magnetic recording medium relative to said head to a different track position on said magnetic recording medium when said detector means determines that said magnetic head has scanned side one position on said magnetic recording medium for said predetermined period of time.

2. Apparatus according to claim 1, in which said means for generating a command signal operates to repeatedly advance said magnetic recording medium step by step and to stop said recording medium each time said predetermined period of time has elapsed.

3. Apparatus according to claim 1, in which said means for generating a command signal also generates a rewind signal fed to said means for transporting, whereby said magnetic recording medium is rewound to a position at which said magnetic recording medium has been stopped at a first time said recording and reproducing apparatus was set into the still playback mode.

4. An edit mode controller, adapted to be operated with first and second recording and reproducing apparatus which record and reproduce video signals in tracks on first and second magnetic recording media, respectively, by magnetic heads arranged therein that respectively scan said first and second magnetic recording media, comprising:
   means for transporting said first and second magnetic recording media;
   means for detecting positions of said first and second magnetic recording media relative to respective magnetic heads of said first and second recording and reproducing apparatus;
   means for selecting functional modes of said first and second recording and reproducing apparatus from a plurality of modes including still reproducing mode and a normal playback mode;

means for detecting whether said magnetic heads of said first and second recording and reproducing apparatus have continuously scanned the same track position on said first and second magnetic recording media for a predetermined period of time when at least one of said first and second recording and reproducing apparatus are in the still playback mode; and means for generating a command signal fed to said one of said first and second recording and reproducing apparatus in said still playback mode for moving said magnetic recording media relative to said magnetic heads such that said magnetic heads scan a different track position when said detector means detect that said magnetic heads have scanned the same track position on said one of said first and second magnetic recording media for said predetermined period of time, said command signal generating means being provided in at least one of said first and second recording and reproducing apparatus.

5. An edit mode controller according to claim 4, in which said means for generating a command signal operates to repeatedly advance and stop said one of said first and second magnetic recording media in a corresponding one of said first and second recording and reproducing apparatus each time said predetermined period of time has elapsed.

6. An edit mode controller according to claim 5, in which said means for generating a command signal also generates a rewind signal, whereby said one of said first and second magnetic recording media is rewound to a tape position at which said one of said first and second magnetic recording media had been stopped at a first time after moving said recording media to a different track position.

7. A method of editing video signals by the use of an edit mode controller adapted to be operated with first and second recording and reproducing apparatus that respectively record and reproduce video signals in tracks on first and second magnetic recording media by magnetic heads arranged therein, comprising the steps of:

transporting said first and second magnetic recording media;

detecting positions of said first and second magnetic recording media relative to said magnetic heads;

selecting functional modes of said first and second recording and reproducing apparatus from a plurality of modes including a still reproducing mode and a normal playback mode;

detecting whether said magnetic heads of said first and second recording and reproducing apparatus have scanned the same positions on said magnetic recording media for a predetermined period of time;

advancing at least one of said magnetic recording media step by step to cause said first and second magnetic heads to scan different track positions when said detector means detect that said magnetic heads have scanned the same position on said first and second magnetic recording media for said predetermined period of time; and synchronizing the advancement of said first and second magnetic recording media with each other, thereby to start a dubbing procedure from predetermined points on said first and second magnetic recording media.

8. A method according to claim 7 further comprising a step of rewinding said first and second magnetic recording media to tape positions at which said first and second magnetic recording media had been stopped at a first time after said first and second recording media are moved step by step and then driving said first and second magnetic recording media in synchronism with each other.

* * * * *